United States Patent [19]

Rose

[11] Patent Number: 5,111,139

[45] Date of Patent: * May 5, 1992

[54] INDUCTIVE DISPLACEMENT TRANSDUCER HAVING AN UNDULATORY MOVEABLE MEMBER

[76] Inventor: Mitchell Rose, 3718 Silsby Rd., University Heights, Ohio 44118

[*] Notice: The portion of the term of this patent subsequent to Apr. 21, 2009 has been disclaimed.

[21] Appl. No.: 502,847

[22] Filed: Mar. 30, 1990

[51] Int. Cl.$^5$ .............................................. G01B 7/14
[52] U.S. Cl. ............................ 324/207.22; 324/207.24
[58] Field of Search ................... 324/207.15, 207.16, 324/207.14, 207.22, 207.25, 207.24, 233; 336/84 R, 84 C, 84 M, 136, 45, 233, 234; 331/65, 67

[56] References Cited

U.S. PATENT DOCUMENTS

| | | | |
|---|---|---|---|
| 3,502,966 | 3/1970 | Perets et al. | 324/207.15 |
| 3,513,408 | 5/1970 | McGee | 324/207.16 X |
| 3,756,081 | 9/1973 | Young | 324/207.16 X |
| 3,900,814 | 8/1975 | Masuda | 324/207.21 X |
| 3,961,243 | 6/1976 | Schulz | 336/136 X |
| 3,991,393 | 11/1976 | Becker, Jr. | 336/84 X |
| 4,203,085 | 5/1980 | Elsässer et al. | 336/324 X |
| 4,502,006 | 2/1985 | Goodwin et al. | 324/233 X |
| 4,536,714 | 8/1985 | Clark | 336/84 R X |
| 4,627,280 | 12/1986 | Hayashi et al. | 324/207.16 X |
| 4,649,341 | 3/1987 | Ulbrich et al. | 324/207.16 |
| 4,652,819 | 3/1987 | Kammerer | 324/236 X |
| 4,667,158 | 5/1987 | Redlich | 324/207.19 |
| 4,950,985 | 8/1990 | Voss et al. | 324/207.16 |

Primary Examiner—Kenneth A. Weider
Assistant Examiner—Warren S. Edmonds
Attorney, Agent, or Firm—Calfee, Halter & Griswold

[57] ABSTRACT

An inductive displacement transducer is provided having a probe capable of being displaced within the hollow interior portion of a coil. The coil, which is typically uniformly wound, is connected electrically in parallel with a stable-frequency current-based oscillator which transmits an AC voltage oscillating signal relating to the inductance of the coil. A demodulating circuit, which is capable of converting the AC voltage oscillating signal to a DC voltage level, is connected in parallel with the oscillator. In one preferred embodiment, the coil is covered with a shield which is slit along its length. In operation, the probe is displaced within a hollow portion of the coil such that a change in inductance of the coil results. A corresponding change in the AC voltage amplitude of the signal output of the oscillator is communicated to the demodulating circuit which generates a change in DC voltage level corresponding to the change in the oscillating signal.

1 Claim, 2 Drawing Sheets

INDUCTIVE DISPLACEMENT TRANSDUCER HAVING AN UNDULATORY MOVEABLE MEMBER

BACKGROUND OF THE INVENTION

The invention relates to electrical apparatuses for converting the relative motion of an object into an electrical signal and more particularly to an improved inductive displacement transducer.

In the field, it is often necessary to convert a position of an object relative to an origin into an electrical signal. This output signal, which can be analog or digital is often then fed into other electrical devices. In process monitoring systems, for example, the signal can be inputted into an electrical indicator which outputs a display of the required data. Such data may include liquid pressure, linear position, tension, or any other like measurement. In process control systems, for example, the electrical signal can be used as feedback and inputted into the controller which acts, based on the nature of the signal, to control the position of the object relative to an origin.

Applications exist for inductive based measurements of linear displacement of a probe. In a device such as that disclosed by U.S. Pat. No. 4,667,158 to Redlich, the linear displacement of a metallic cylindrical core within a helical coil of wire causes corresponding changes in the amplitude of the voltage signal imposed across the coil. This voltage signal is then demodulated by a half-wave rectifier including a diode, a resistor and a low-pass filter. A reference signal is demodulated by a second identical half-wave rectifier. The demodulated reference signal and the demodulated coil voltage signal are fed into the inverting and non-inverting inputs of a differential amplifier having an output which drives an electrical indicating instrument.

As disclosed by the Redlich patent, a metal jacket may be positioned around the coil of a displacement transducer to confine magnetic flux generated by the coil, as a result of current being transmitted therethrough, and to shield the transducer from stray fields. Redlich indicates that, when using the shield, it is desirable to increase sensitivity by partially filling the space between the coil and the shield with bonded ferrite powder.

It has been determined through experimentation, that use of a cylindrical shield, such as that disclosed by Redlich, that is substantially continuous throughout its length, tends to significantly degrade sensitivity. Thus, adequate sensitivity in measurement could not be achieved with the Redlich arrangement unless the space between the coil and the shield was filled with bonded ferrite powder or the like. In practice, filling the space defined by the shield and the coil is disadvantageous, however, since it leads to increases in cost of materials and requires the use of additional steps during the process of manufacturing the transducer. Thus there is a need for a shield arrangement in which acceptable levels of measurement sensitivity are maximized without significantly increasing manufacturing costs and procedure.

In a similar device, such as that shown in U.S. Pat. No. 3,513,408 to McGee, the movement of a tapered magnetic core with respect to a fixed coil of wire causes changes in the inductance of the coil. These changes in inductance determine the frequency of an oscillator, and the frequency output of the oscillator is converted by a demodulator circuit into a digital signal or an analog output voltage. In order to maintain linearity, the McGee transducer depends on the use of the tapered core.

SUMMARY OF THE INVENTION

According to the present invention, an inductive displacement transducer is provided which uses a probe capable of being disposed within an inductive coil having a hollow interior portion in which the probe can be displaced. The coil is connected electrically in parallel with a stable frequency current-based oscillating circuit which transmits an AC voltage oscillating signal relating to the inductance of the coil. Additionally, a demodulating circuit, which is capable of converting the AC voltage oscillating signal to a DC voltage level, is connected in parallel with the oscillating circuit. In one preferred embodiment, the coil, which has a longitudinal axis, is uniformly wound and covered with a shield. The shield, which in one example is a metal jacket, has a slit disposed therein. The slit is co-extensive with the longitudinal axis of the coil and preferably extends along the entire length of the shield.

During operation, displacement of the probe within the coil results in changes in the inductance of the coil. A change in inductance results in a corresponding change in the AC voltage amplitude of the signal output of the oscillating circuit, which in turn is communicated to the demodulating circuit. A DC voltage level corresponding to the linear or non-linear change in the voltage amplitude of the signal output of the oscillating circuit is outputted by the demodulating circuit.

In one aspect of the invention, the probe can include various probe types which are used to enhance the sensitivity and/or the flexibility of the transducer. For example, a compound probe comprising a plurality of wires can be used to substantially increase sensitivity. Additionally, a probe assembly including a metal rod member, a portion of which is disposed within a tube, can be used to gain measurements under those circumstances in which the displacement of two surfaces moving relative to one another is desired. Finally, various probe shapes, and more particularly probe surfaces, can be employed to alter either the linearity or non-linearity of the transducer response.

Numerous advantages of the present invention will be appreciated by those skilled in the art.

One advantage of the invention is that it presents a particularly economical way to achieve accurate measurements of displacement. In particular, a transducer which maximizes sensitivity while minimizing production costs is provided. For example, by adding a shield with a slit disposed therein, effects of temperature and circuit drift are significantly reduced while the coil is still protected from stray fields. Additionally, sensitivity can be enhanced by many orders of magnitude when a probe made up of a plurality of wires is used.

Another advantage of the transducer is that it promotes simplicity of design on both structural and procedural levels while maintaining highly desirable levels of measurement capability. It is particularly significant that the transducer eliminates many of the inefficiencies and/or difficulties encountered when making inductive based measurements requiring non-linear response and displacement of multiple surfaces moving relative to each other. According to the present invention, measurements of non-linear responses are easily made by the transducer without any need to alter the transducer circuitry. More specifically, non-linear measurements are effectively achieved by simply reconfiguring an edge of the probe member. Additionally, measurements of multiple surfaces moving relative to each other can be made with an assembly that is readily positioned and moved relative to the coil.

These and other features, advantages and objects of the present invention will be further understood and appreciated by those skilled in the art by reference to the following written specification, claims and appended drawings.

DETAILED DESCRIPTION OF THE PREFERRED EMBODIMENT

It is understood that the invention described below may assume various alternative orientations and step sequences except where expressly specified to the contrary. It is also to be understood that the specific devices and processes illustrated in the attached drawings, and described in the following specification, are simply exemplary embodiments of the inventive concepts defined in the appended claims. Hence, specific dimensions, and other physical characteristics related to the embodiments disclosed herein are not to be considered as limiting, unless the claims by their language expressly state otherwise.

Figure 1:
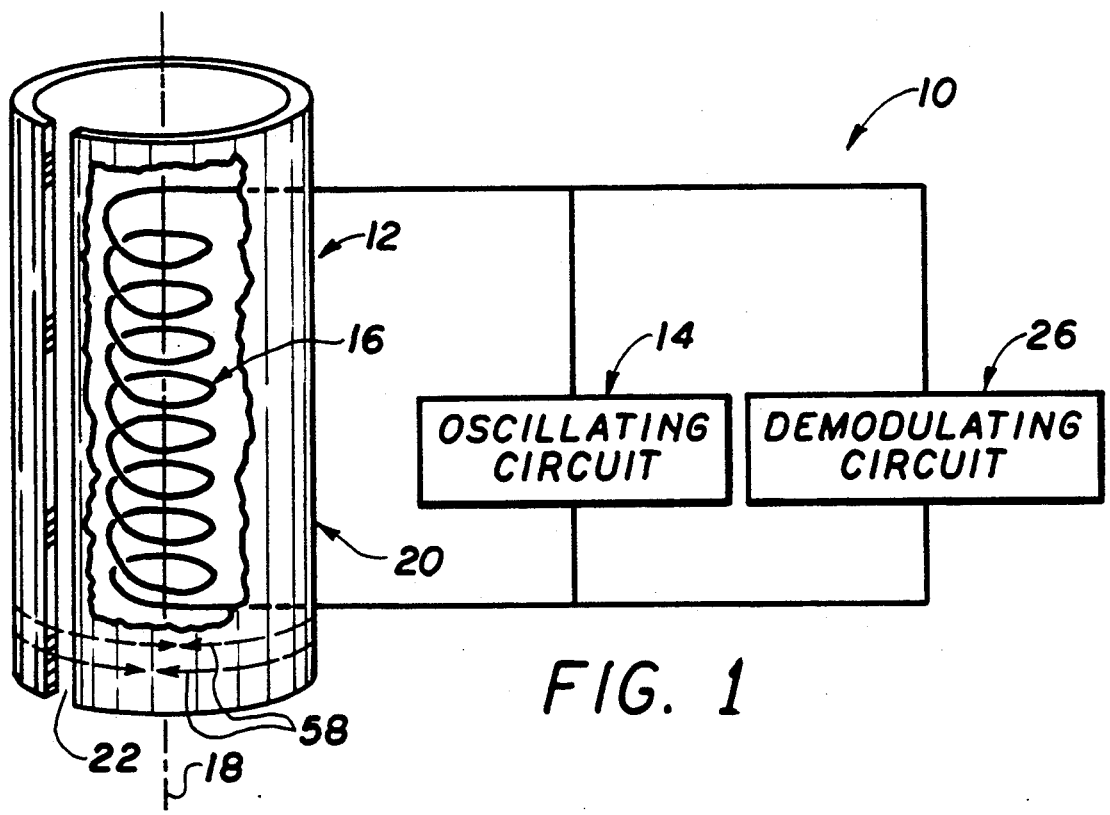
FIG. 1 is a partially diagramatic, partially perspective view of an inductive displacement transducer embodying the present invention which includes a shield having a partially broken away portion.

Referring to FIG. 1, the inductive displacement transducer embodying the present invention is designated by the numeral 10. The transducer 10 includes a coil arrangement 12 and an oscillating circuit 14. In one example, the coil arrangement includes a coil 16, which is cylindrical and uniformally wound. Additionally, the coil 16 is disposed along a longitudinal axis 18, and in order to generate a magnetic field, the coil is made of a conductive material through which current can readily be transmitted. Finally, the coil may, in one example, have a length ranging from 1 in.–25 in. and a diameter ranging from 0.1 in.–0.5 in. In one preferred embodiment of the present invention, the coil 16 is covered by a shield 20 including a slit 22, the significance of which is discussed in further detail below.

The oscillating circuit 14, which is connected in parallel with the coil arrangement 12, includes conventional componentry and is designed to produce a sine wave having a frequency and a current amplitude, both of which are constant. A demodulating circuit 26, which is also constructed of known componentry is disposed electrically in parallel with the oscillator circuit 14. It has been determined that desirable demodulation can be achieved by using the demodulator circuit of U.S. Pat. No. 4,667,158 to Redlich, which is incorporated by reference herein. The demodulating circuit 26 is designed to output a DC voltage that is linearly related to the voltage amplitude of the sine wave output of the oscillating circuit 14.

Figure 2:
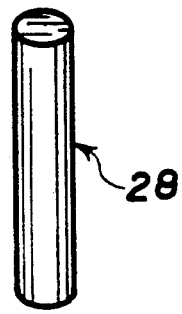
FIGS. 2-7 illustrate perspective views of probes used to expand capability of the transducer.
Figure 3:
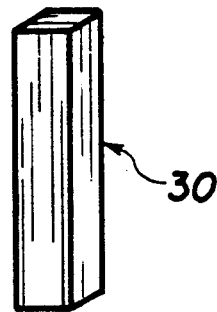
Figure 4:
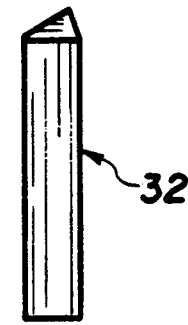

As explained in further detail below, operation of transducer 10 depends on the use of a probe which may assume various shapes. Referring to FIGS. 2-4, probes 28, 30 and 32, which assume various cross-sectional shapes, are illustrated. In one example, each of probes 28, 30 and 32 has a uniform cross-sectional area throughout its length, and as illustrated by FIGS. 2-4, the cross-sectional shapes of probes 28, 30 and 32, as viewed along the transverse cross-sections of probes 28, 30 and 32, are round, square and triangular, respectively.

Figure 5:
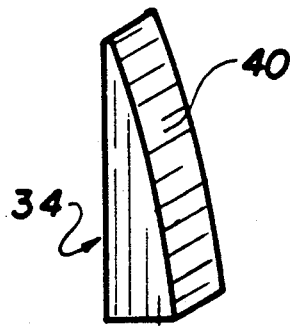
Figure 6:
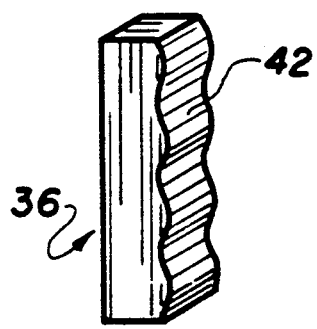
Figure 7:
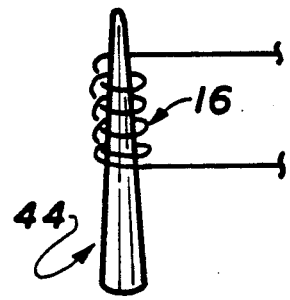

Referring to FIGS. 5-6, probes 34 and 36, having non-uniform cross-sectional areas throughout their respective lengths, are illustrated. It should be observed that probe 34 has a slightly curved edge surface 40, while probe 36 has an undulating edge surface 42. Referring to FIG. 7, another tapered probe 44 is illustrated. The probe 44 is frusta-conically shaped, and, in the preferred embodiment, at least a portion of probe 44 is capable of being extended through the entire length of the interior portion of coil 16.

In the preferred embodiment, each of the above described probes 28, 30, 32, 34 and 36 are made of ferromagnetic material. Alternatively, either of probes 28, 30, 32, 34 and 36 may be made of a non-ferromagnetic material, such as aluminum. Experimentation has indicated, however, that optimum measurements are achieved through use of a probe made of ferromagnetic material.

Figure 8:
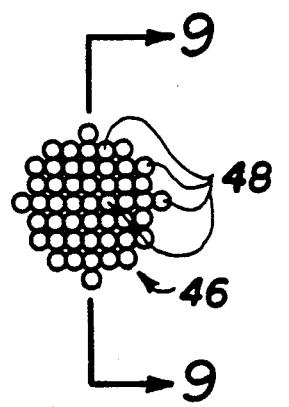
FIG. 8 is an end view of a probe constructed from a plurality of wires.
Figure 9:
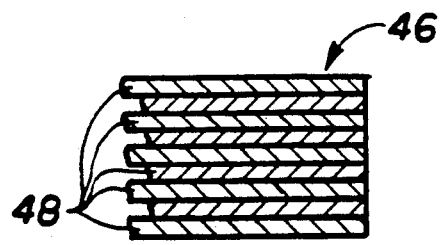
FIG. 9 is a longitudinal cross-sectional view of the probe of FIG. 8 taken along the plane 9—9.

Referring to FIGS. 8-9, a probe, which is capable of enhancing sensitivity of transducer 10 is designated by the numeral 46. In the preferred embodiment, probe 46 can assume the shape and dimensions of any of the probes typically employed, such as probe 28. The difference between probe 46 and any of the probes discussed above is that probe 46 is constructed from a plurality of wires 48 which are conventionally bound together. It has been determined that steel cable having 49 strands, typically found in hardware stores, can be employed to achieve desirable measurements. To construct probes 46 of varying shapes, applicant has found that it is desirable to use wires of varying shapes. For example: to construct a cylindrically-shaped probe 46, such as probe 28, it is appropriate to use wires having a round cross-section; to construct a rectangularly shapes probe, such as probe 30, it may be desirable to use wires having a rectangular cross-section; and so on.

Figure 10:
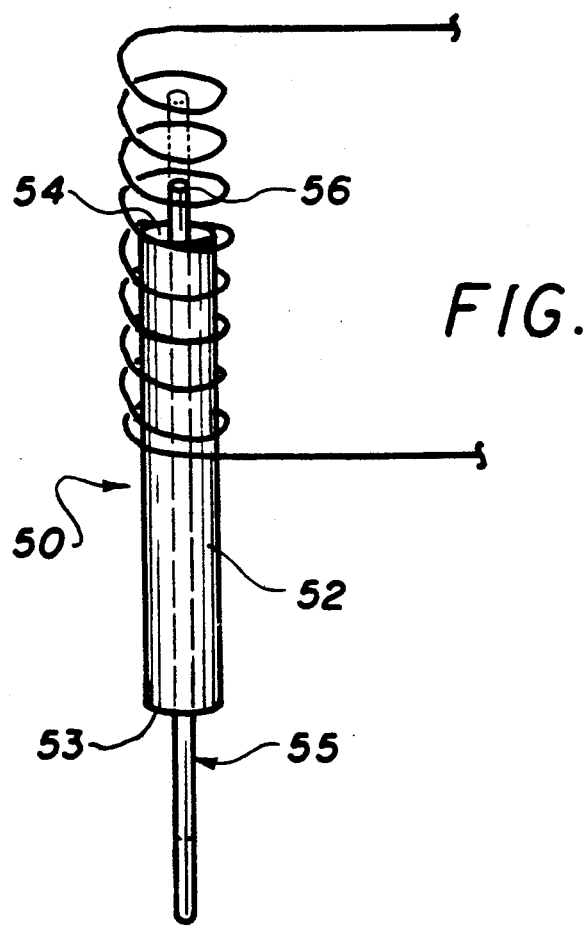
FIG. 10 illustrates a partial perspective view of FIG. 1 with the shield broken away and a probe assembly, adapted to measure the displacement of two surfaces capable of moving relative to one another, inserted therein.

Referring to FIG. 10, a probe assembly adapted to measure the displacement of multiple surfaces moving relative to one another is designated by the numeral 50. Probe assembly 50 includes a hollow tube 52 having openings 53, 54 and a rod member 55 having an end 56. In one aspect of the invention, the rod member 55 has a length which is greater than that of hollow tube 52 such that a substantial portion of the rod member 55 can be disposed within the hollow portion of tube 52, and a lower end of rod member 55 can be grasped for movement of the same along longitudinal axis 18. In one example, the hollow tube 52 is made of a nonferromagnetic material, while the rod member 55 is made of a ferromagnetic material.

In one preferred form of operation, in which linear displacement of a probe is to be measured, the above-described sine wave is produced using the oscillating circuit 14 (FIG. 1), and probe 28 is inserted into the hollow interior portion of coil 16. As the axial position of probe 28 is altered, the load on oscillating circuit 14 is correspondingly altered. To maintain constant current amplitude, the oscillating circuit 14 adjusts its voltage amplitude. Since the AC amplitude of the output of the oscillating circuit 14 is linearly related to the inductance of coil 16, and the DC voltage output of the demodulating circuit 26 is linear with the AC voltage amplitude of the output of the oscillating circuit 14, the output of the demodulating circuit 26 responds linearly, the positional adjustment of probe 28 along the longitudinal axis 18 of coil 16.

It should be noted that while probe 28 was employed to achieve the above-described linear response, use of either of probes 28, 30 and 32 would result in the type of linear response as described above. Additionally, when a ferromagnetic probe is employed, the voltage output of the demodulating circuit 26 is positive, while, conversely, when an aluminum probe is employed, the voltage output of the demodulating circuit 26 is negative.

As mentioned above, the shield 20 is advantageously provided with a slit 22. In particular, it has been determined through experimentation that use of a solid walled shield 20 will lead to degradation in sensitivity of measurements achieved. Providing slit 22, as mentioned above, significantly enhances measurement sensitivity. An understanding of why such enhancement occurs can be more fully understood by referring again to FIG. 1 and more specifically to arrows 56 which represent exemplary electron flow paths which would exist about the surface area of shield 20 if it were continuous. When the electrons are allowed to flow in continuous circular paths about the surface of the shield 20, sensitivity is decreased. By slitting the shield 20, electron flow about the surface area is inhibited and the source of sensitivity reduction is eliminated. As will be appreciated by those skilled in the art, the addition of slit 22 is an eloquent and simple way to enhance sensitivity. More significantly, since manufacturing shield 20 with a slit is readily achieved, manufacturing costs are reduced, thus allowing for the production of an inexpensive, yet effective, transducer.

Various capabilities and advantages associated with some of the structural features discussed above can now be further appreciated. Referring to FIGS. 2-4, probes 28, 30 and 32 are constructed to provide for linear response from the transducer. On the other hand, referring to FIGS. 5-6, the probes 34 and 36 have tapered side edges 40 and 42 to afford non-linear response from the transducer 10. More specifically, probe 34 is adapted to provide a logarithmic relationship between the output of transducer 10 and probe position, while probe 36 allows for a sinusoidal relationship between the output of transducer 10 and probe position.

Referring to FIG. 7, it will again be noted that at least a portion of tapered probe 44 can be inserted completely through the interior, hollow portion of coil 16. As should be understood, in many commonly employed configurations of inductive displacement transducers, one end of the probe must always be outside of the coil and the other end must always be within the coil. In these embodiments, the measurable displacement is limited by the length of the coil. With the tapered or frusta-conical probe 44 of FIG. 7, the transducer 10 can measure displacement that is much larger than the coil 16 since the extent to which the probe 44 can be inserted through coil 16 is not limited, as with the configurations mentioned immediately above. Indeed the only limiting factor when using tapered probe 44 is the extent to which the circumference of the probe varies from the top of the probe 44 to the bottom of the probe 44.

Referring again to the probe 46 of FIGS. 8-9, it should be appreciated that the sensitivity of measurement is dramatically increased as the amount of wires employed to construct a given probe is increased. More specifically, the sensitivity of the transducer will be increased when it is used in conjunction with a probe composed of more than two metal wires 48, such as the multiple wire probe 46. It has been determined that when the probe 46 is constructed from a number, n, of wires 48, each of which is substantially uniform, the sensitivity gain of transducer 10, i.e. S, will vary as a function of the square root of n according to the following equation:

$$S = \sqrt{n}$$

where:
S = gain in sensitivity for a probe constructed from a plurality of wires.
n = number of wires used to construct the probe.

To more fully understand the above relationship, consider the following example: a cylindrically shaped probe having a given total circumference is constructed of 49 wires. In that case, the sensitivity of the transducer 10, when used with the probe 46, will be seven times greater than if a solid probe of the same total circumference had been used. It should be appreciated that the above relationship holds true for other probes having transverse cross-sectional shapes which differ from that of probe 28. Additionally, the above relationship should be applicable, possibly to a lesser degree, even when non-uniform wires, such as dissimilar or tapered wires, are used to construct the probe 46.

In another preferred form of operation, probe assembly 50, as shown in FIG. 10, is initially inserted into the hollow portion of coil 16 with the end 56 of rod member 55 disposed near or above the opening 54 of tube 52. Upon positioning a portion of tube 52 within coil 16, both of the hollow tube 52 and the rod member 55 can be slidably displaced within the hollow interior of coil 16—axially independent of each other. The coil inductance, and hence the voltage output of the transducer, is proportional to that length of rod member 55 which protrudes out of hollow tube 52, provided that both of the protruding portion of rod member 55 and a portion of tube 52 are disposed within the hollow portion of coil 16.

In the foregoing description, it will be readily appreciated by those skilled in the art that modifications may be made to the invention without departing from the concepts disclosed herein. Such modifications are to be considered as included in the following claims unless those claims, by their language, expressly state otherwise.

The embodiments of the invention in which an exclusive property or privilege is claimed are defined as follows:

1. A transducer for measuring linear displacement of an object, comprising:
   a uniformly wound substantially cylindrical coil for generating a magnetic field when an electrical current passes therethrough, said coil having a predetermined length and an inductance determined in part by said length, said coil defining a hollow interior portion and having a longitudinal axis;

an elongate steel probe for changing the inductance of said coil in response to the insertion of said probe within said hollow interior portion of said coil along said longitudinal axis, said steel probe having at least one surface coextensive with said predetermined length of said coil which is substantially undulatory in shape;

a protective shield surrounding a substantial portion of said probe and said coil, said protective shield having a slit aligned with said longitudinal axis of said coil and extending the entire length thereof;

an oscillating circuit connected electrically in parallel to said coil, said oscillating circuit being responsive to said change in the inductance of said coil to output an oscillating signal having a voltage amplitude varying as a function of the change in the inductance; and a demodulating circuit connected electrically in parallel to said oscillating circuit, said demodulating circuit being responsive to changes in said oscillating signal of said oscillating circuit to output a sinusoidal voltage signal relating to the axial position of said probe within said hollow interior portion of said coil.

* * * * *